US005853519A

United States Patent [19]
Watanabe et al.

[11] Patent Number: 5,853,519
[45] Date of Patent: Dec. 29, 1998

[54] PROCESS FOR APPLYING MASKING TAPE AND APPARATUS FOR CARRYING OUT THE SAME PROCESS

[75] Inventors: Sizuo Watanabe, Tokyo; Koji Sakaki, Ibaraki, both of Japan

[73] Assignee: Nippon Mining & Metals Co., Ltd., Tokyo, Japan

[21] Appl. No.: 886,276

[22] Filed: Jul. 1, 1997

[30] Foreign Application Priority Data

Jul. 30, 1996 [JP] Japan .................................. 8-216834

[51] Int. Cl.⁶ ...................................................... B32B 31/00
[52] U.S. Cl. ........................ 156/247; 156/259; 156/344; 156/517; 156/584
[58] Field of Search ..................................... 156/247, 249, 156/344, 584, 256, 259, 539, 517, 519, 280, 537; 427/282, 468

[56] References Cited

U.S. PATENT DOCUMENTS 4,430,137  2/1984  Jones ........................ 156/247
5,635,007  6/1997  Weinberg ..................... 156/247

FOREIGN PATENT DOCUMENTS

7-278876  10/1995  Japan .

*Primary Examiner*—James Engel
*Attorney, Agent, or Firm*—Ostrager Chong Flaherty & Onofrio

[57] ABSTRACT

The present invention provides an apparatus for continuously applying cut masking tapes MT on an elongated metal strip J in a longitudinal direction thereof, comprising means 20 for guiding said metal strip J to a given position in a width direction thereof at a first step; means 10 for continuously cutting an original masking tape MT into a given number of tapes having predetermined widths with reference to said guided given position and for supplying them at a second step; means 60 for continuously pressure adhering said cut masking tapes MT on said elongated metal strip J at a third step and means 50 for continuously separating and removing unnecessary part of said applied masking tapes MT at a fourth step.

20 Claims, 6 Drawing Sheets

PROCESS FOR APPLYING MASKING TAPE AND APPARATUS FOR CARRYING OUT THE SAME PROCESS

BACKGROUND OF THE INVENTION

1. Field of the Invention

The present invention relates to a process for applying masking tapes to protect portions other than portions to be plated and a masking tape applying apparatus for carrying out the same process in a process for manufacturing gold, silver, solder-stripe plated strip used for lead materials for various terminals of connectors and IC lead frames.

2. Description of Related Art

Stripe plated strips are used for materials of various terminals of connectors and IC lead frames.

Stripe plated strip is a strip base which is manufactured by plating an elongated metal strip of copper alloy, stainless steel or nickel and the like in a longitudinal direction in such a manner that plated portion and unplated portion are continuously formed in the form of stripe.

The stripe plated strip may be made by two steps including a taping step for applying cut masking tapes on a metal strip to form unplated portions and a step for plating the metal strip with gold, silver or solder. The process may further include a preliminary step for plating a copper or nickel undercoat prior to the taping step.

Figure 6:
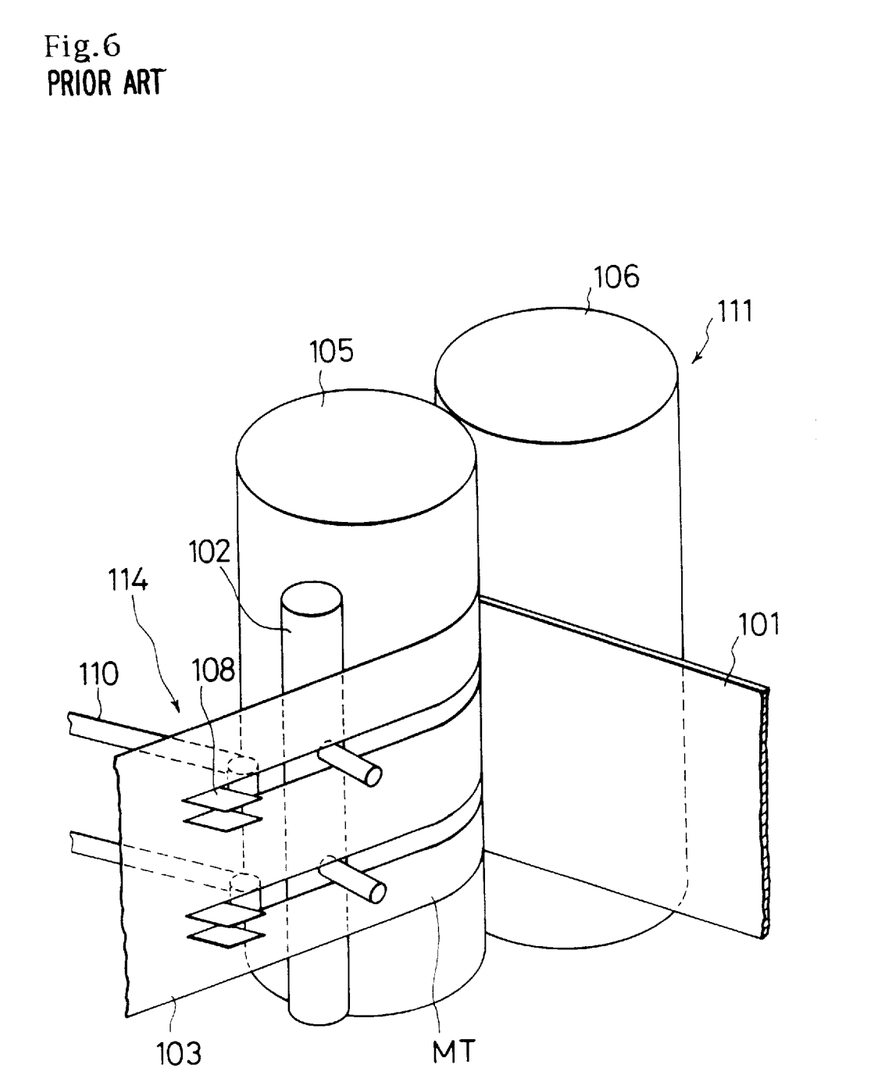
FIG. 6 is a schematic view showing a conventional masking tape applying apparatus.

A conventional process for applying masking tape is disclosed in Japanese Unexamined Patent Publication No. Hei 6-68239 (refer to FIG. 6). An original masking tape 103 is cut in a longitudinal direction into a given number of cut masking tapes 104, each having a predetermined width, by razor blades 108 prior to being applied on a strip base 101. Thereafter, unnecessary masking tapes 110 are removed by a cutting and separating unit 114. The cut masking tapes 104 are guided by a tape guide 102 so that they are supplied to an application roll 105 of an applicator 111. They are brought into pressure contact with the strip base 101 by a pressure applying roll 106 of the applicator 111 so that they are applied thereon. The above-mentioned taping step is continuously conducted.

With the increase in the degree of integration from ICs into LSIs, accuracy in plating width and spacing therebetween of the stripe plated strips used as lead frame material becomes more severe. The required accuracy or plating position is currently +0.05 mm or less.

The accuracy of plating position and width is directly determined by the accuracy of application of the masking tape. In other words, the accuracy of plating position and width can be enhanced by enhancing the accuracy of application of the masking tape.

Theoretically, accuracy of plating position and width can be enhanced by applying cut masking tapes on an elongated metal strip as soon as possible. However, there is a limitation to close the razor blades toward the application roll 105 in the conventional masking tape applying process since the cutting/separating apparatus 114 is disposed between the razor blades 108 of the cutting/separating unit 114 and the application roll 105 of the applicator 111.

As a result of removal of unnecessary tapes spaces are formed between cut masking tapes which are brought into pressure contact with the strip base. The spaces may cause variations in tape position.

If the amount of unnecessary tape is excessively large for the width of the original masking tape, the tension on the cut masking tape would change upstream and downstream of the razor blade 108 as a result of removal of the unnecessary masking tape. Therefore, the masking tape to be applied will stretch so that the dimension of the width may change.

It is an object of the present invention to provide a process for applying masking tapes and a masking tape applying apparatus for carrying out the same process which overcome the foregoing problems of the prior art and is capable of coping with enhanced accuracy of plating position and decrease in plating width of stripe plated strip.

SUMMARY OF THE INVENTION

In order to accomplish the above-mentioned object, the present invention provides a process for continuously applying masking tape on an elongated metal strip in a longitudinal direction thereof, comprising: a first step for guiding said metal strip to a given position in a width direction thereof; a second step for continuously cutting an original masking tape into a given number of tapes having predetermined widths with reference to said guided given position and for supplying them; a third step for continuously pressure adhering said cut masking tapes on said elongated metal strip by means of pressure adhering means; and a fourth step for continuously separating and removing part of said applied masking tapes.

Said first step may include a step for guiding said metal strip by vertically or laterally sandwiching it between a pair of rolls.

Said second step may include a step for cutting a masking tape by cutting means having a blade portion in which a plurality of blades are disposed in given positions in a width direction of the masking tape, a holding portion for holding said blade portion; a slide portion for sliding in the width direction of the masking tape said blade portion together with said holding portion; and measuring portion for finely adjusting the position of said slide portion; and a portion for securing said slide portion.

Said third step may include a step for continuously pressure adhering masking tapes on said metal strip by vertically sandwiching them between a fixed lower roll and an upper roll liftably provided above said lower roll, having means for adjusting the applying pressure on said lower roll.

Said fourth step includes a step for continuously separating part of the masking tape adhered to said metal strip by using a roll having a smaller diameter downstream of said upper roll.

The present invention further provides an apparatus for continuously applying masking tape on an elongated metal strip in a longitudinal direction thereof, comprising: means for guiding said metal strip to a given position in a width direction thereof; means for continuously cutting an original masking tape into a given number of tapes having predetermined widths with reference to said guided given position and for supplying them; pressure adhering means for continuously pressure adhering said cut masking tapes on said elongated metal strip; and means for continuously separating and removing part of said applied masking tapes.

Said guiding means may include a pair of rolls for guiding said metal strip by vertically or laterally sandwiching it therebetween.

Said cutting means may include a blade portion in which a plurality of blades are disposed in given positions in a width direction of the masking tape, a holding portion for holding said blade portion; a slide portion for sliding in the width direction of the masking tape said blade portion together with said holding portion; and measuring portion for finely adjusting the position of said slide portion; and a portion for securing said slide portion.

Said adhering means may include a fixed lower roll and an upper roll liftably provided above said lower roll, having means for adjusting the applying pressure on said lower roll.

Said separating means may include a roll having a smaller diameter downstream of said upper roll for continuously separating part of the masking tape adhered to said metal strip.

BRIEF DESCRIPTION OF THE DRAWINGS

The process for applying adhesive tapes in accordance with the present invention and the masking tape applying apparatus for carrying out the same process will be described in detail by way of preferred embodiments with reference to the drawing in which.

BEST MODES FOR EMBODYING THE INVENTION

Now, the structure of the masking tape applying apparatus 1 of the present invention will be described in detail.

Figure 1:
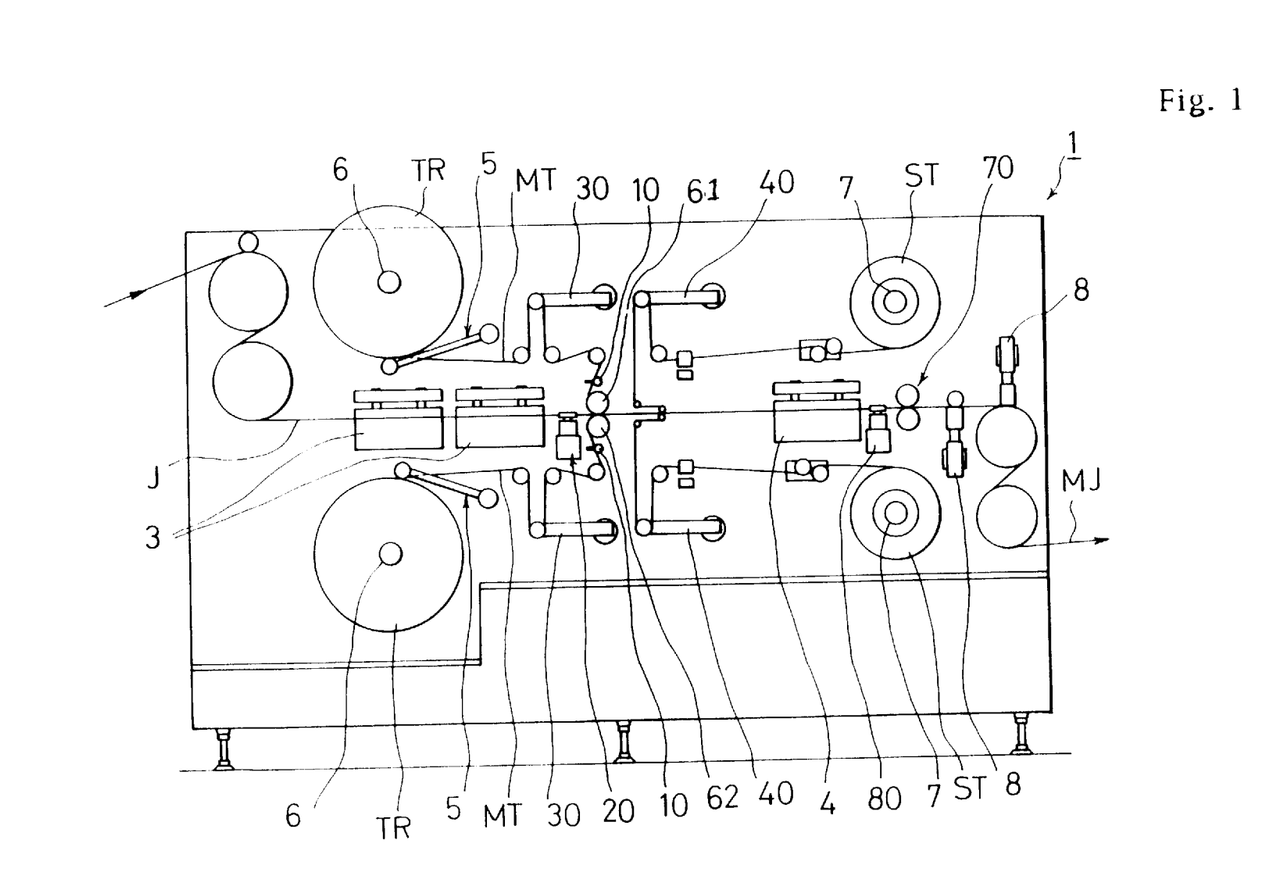
FIG. 1 is a front view showing an embodiment of the masking tape applying apparatus of the present invention.

The masking tape applying apparatus 1 mainly comprises a guide unit 20 for guiding at a first step a metal strip J which is fed at a constant speed, a supply unit for supplying masking tape at a second step, a first pressure adhering unit 60 which is used at a third step and a separating unit for separating scrap tapes ST at a fourth step.

Figure 2:
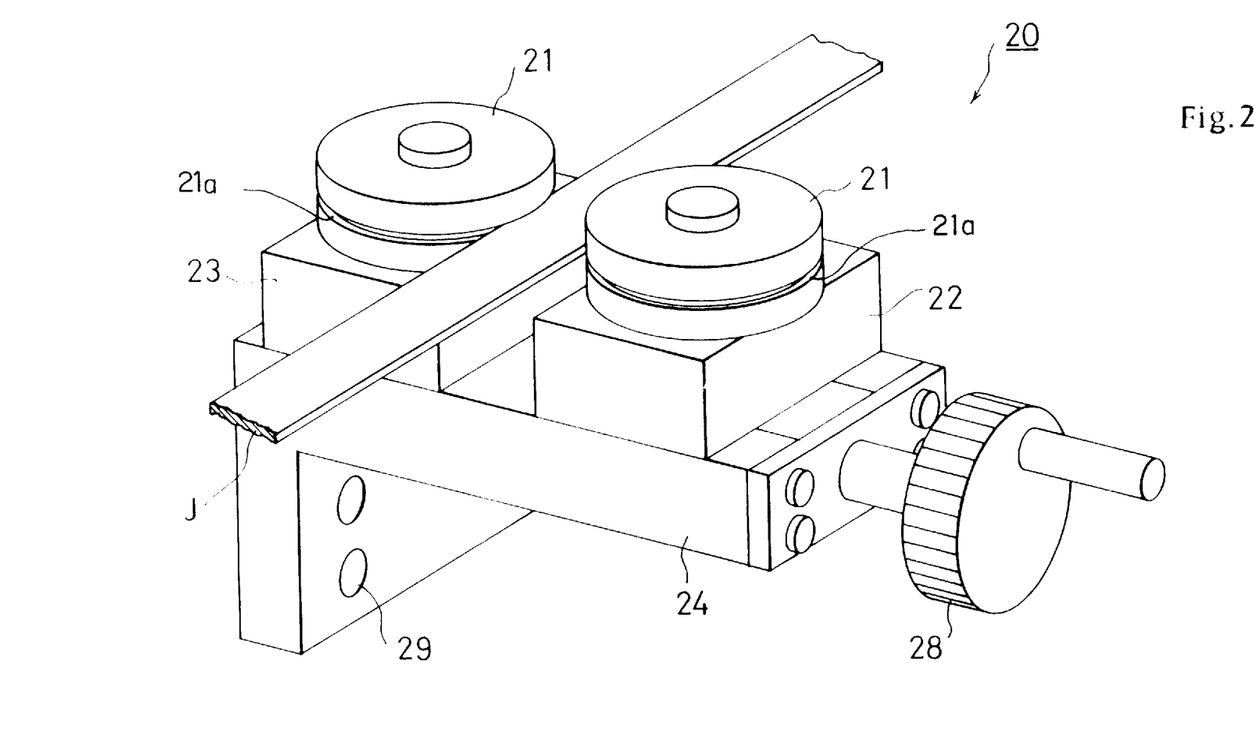
FIG. 2 is a schematic view showing a unit for guiding a metal strip.

The guide unit 20 at a first step comprises a pair of rolls 21 between which the metal strip J is disposed in a width direction; a slide roll holder 22 having its vertical shaft on which one of the rolls 21 is rotatably journalled, said holder 22 being slidable in a width direction of the metal strip J, a stationary roll holder 23 having its vertical shaft on which another roll 21 is rotatably journalled, said holder 23 being fixed; a slide base 24 having a linear guide mechanism enabling the slide roll holder 22 to slide in a width direction of the metal strip J, a mount for mounting the stationary roller holder 23 and a plurality of mounting holes 29 for securing the slide base 24 to the main body of the masking tape applying apparatus 1; and a knob 28 for making the linear guide mechanism of the slide base 24 slide.

The rolls 21 may be preferably provided on the outer periphery thereof with grooves 21a to which the opposite edges of the metal strip J are fitted. Fitting of opposite edges of the metal strip J into the groove 21a enables the metal strip J to be stably guided.

The guide unit 20 is capable of guiding various metal strips having different widths by sliding the slide roll holder 22 by rotating the knob 28.

The knob 28 may be preferably provided with graduate representative of the knob rotation angle or the slide length corresponding to knob angular movement. Alternatively, measuring instrument may be provided which is capable of directly measuring the slide length of the slide roll holder 22.

Figure 3:
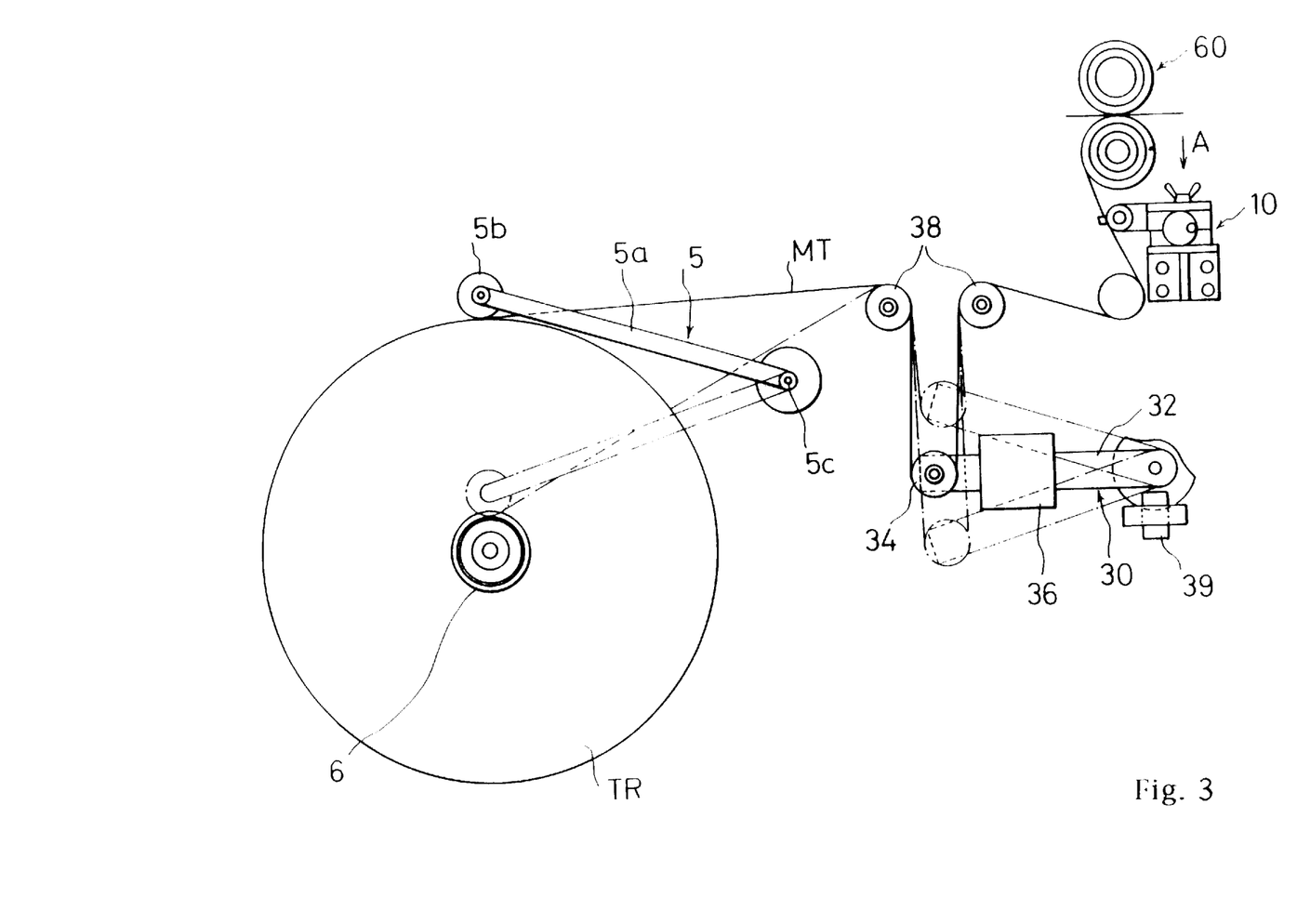
FIG. 3 is a front view showing a unit for supplying a masking tape shown in FIG. 1.

The unit for supplying a masking tapes which is operated at a second step comprises feeding shafts 6 on which tape rolls TR in the form of rolls of original masking tapes MT are mounted and are driven by motors, supplying dancers 30 for controlling the feeding speed of the masking tapes and the tension of the masking tapes to a constant value, and a cutting unit 10 for continuously cutting the masking tape to a given number of tapes each having a given width.

Each of the supplying dancers 30 comprises a swingable dancer arm 32, a dancer roller 34 mounted on the tip of the dancer arm 32, a pair of spaced guide rollers 38 above the dancer roller 34, and an angle sensor 39 for detecting the swing angle of the dancer arm 32.

The dancer arm 32 of the supplying dancer 30 is swung vertically in response to the difference between the speed of the metal strip J and the masking tape MT. When speed of the masking tape MT is higher than that of the metal strip J, the dancer arm 32 is descended. Conversely when the speed of the metal strip J is higher than that of masking tape MT, the dancer arm 32 is ascended. The swing movement of the dancer arm 32 is detected by the angle sensor 39 which outputs a signal representative of the change in angle of the dancer arm 32 to a control unit (not shown). The control unit is adapted to control the rotational speed of a motor for driving each of the feeding shafts 6 of the masking tape in such a manner that the angle of the dancer arm 32 is constant.

Accordingly, a constant feeding speed can be maintained without being influenced by the changes in the outer diameter of the tape roll TR and the speed of the metal strip J.

Thus, the feeding shaft 6 may be preferably provided with a touch roll 5. The touch roll 5 comprises an arm 5a, a touch roller 5b and biasing means (not shown). This roll enables the masking tape MT to be smoothly fed while the feeding position of the masking tape MT is kept constant, so that the dancer arm 32 can smoothly swings Mounting of a weight 36 on the dancer arm 32 enables the masking tape MT to be constantly tensioned at a given tension without any need to provide any braking mechanism.

Figure 4:
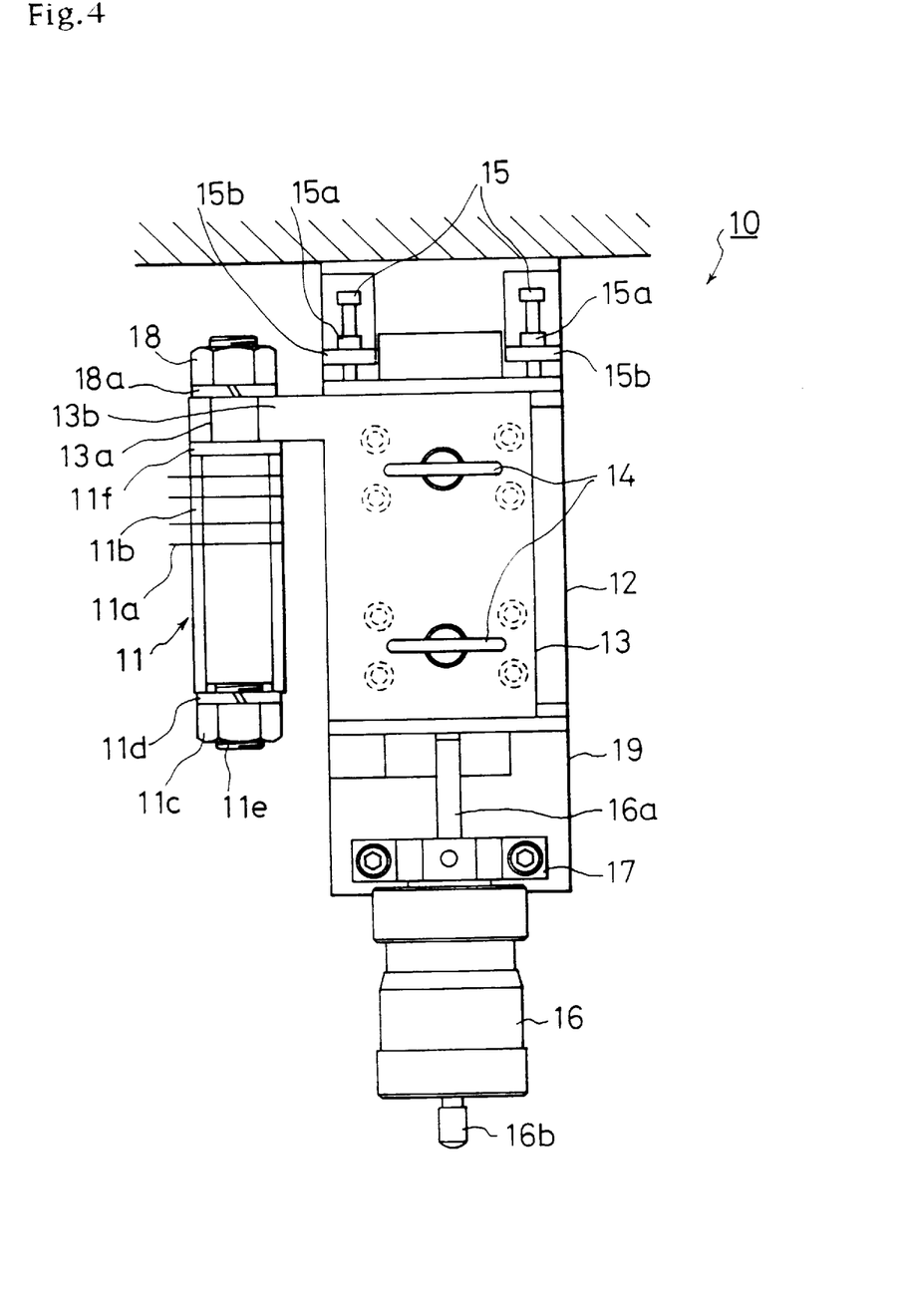
FIG. 4 is a view of a unit for cutting masking tape in FIG. 3 as viewed in a direction of an arrow A.

The cutting unit 10 mainly comprises a cutter 11, a holding mechanism for holding the cutter 11, a slide mechanism for sliding the holding mechanism in a width direction of the metal strip J, a measuring mechanism for precisely measuring the position of the cutter 11 in a width direction for its fine adjustment, and a securing mechanism for securing the cutter 11 to a given position along of its sliding length.

The cutter 11 comprises a shank 11e having a longer and shorter shafts which are disposed on either side of a shoulder 11f and having a threaded portion on respective tips of the shafts; a plurality of cutter blades 11a through which the longer shaft of the shank 11e extends and which are supported thereon;

a plurality of spacers 11b between the cutter blades 11a, through which the shank 11e extends and which are supported thereon; a nut 11c which is screwed on the tip portion of the longer shaft of the shank 11e for integrally securing the cutter blades 11a and spacers 11b; and a washer 11d for preventing the nut 11c from loosening.

The holding mechanism comprises a cutter holder 13 having a holder 13b which projects from a holder main body at its upper and left portions as viewed in FIG. 4 and a mounting hole 13a at the front end of the holder 13b, extending in a width direction of the metal strip J. The cutter 11 is mounted on the cutter holder 13 by inserting the shorter shaft portion into the mounting hole 13a of the cutter holder 13 and presetting the angle of the cutter 11 with respect to the metal strip J and then fastening the fastening nut 18 so that a washer 18a is disposed between the nut 18 and the holder 13a.

The slide mechanism comprises a platen 19 which are secured to the main body of the masking tape applying apparatus 1, and a stage 12 having a linear guide mechanism on the platen 19, which is slidable in the width direction of the metal strip J. The cutter holder 13 is mounted on the stage 12.

The measuring mechanism comprises a micrometer mounting bracket 17 mounted on the lower side of the platen 19 as shown in FIG. 4 and a micrometer 16 secured to the micrometer mounting bracket 17.

The securing mechanism comprises a pair of bases 15b which are disposed on the platen 19 on the opposite side of the micrometer 16 and each having a threaded hole extending in a slide direction of the stage 12, biasing bolts 15, each threaded into the threaded hole of the base 15b and locking nuts 15a for securing the biasing bolt 15 to a given position.

After the plunger 16a is moved to a given position by rotating the micrometer knob 16b of the micrometer 16, the stage 12 is secured by fastening the biasing bolts 15 and the biasing bolts 15 are locked by the locking nuts 15a. The cutter 11 is thus fixed.

The cutter holder 13 may be secured to the stage 12 by means of butterfly bolts 14. The cutter 11 can be easily and safely removed from and mounted on the stage 12 while it is mounted on the cutter holder 13.

Figure 5:
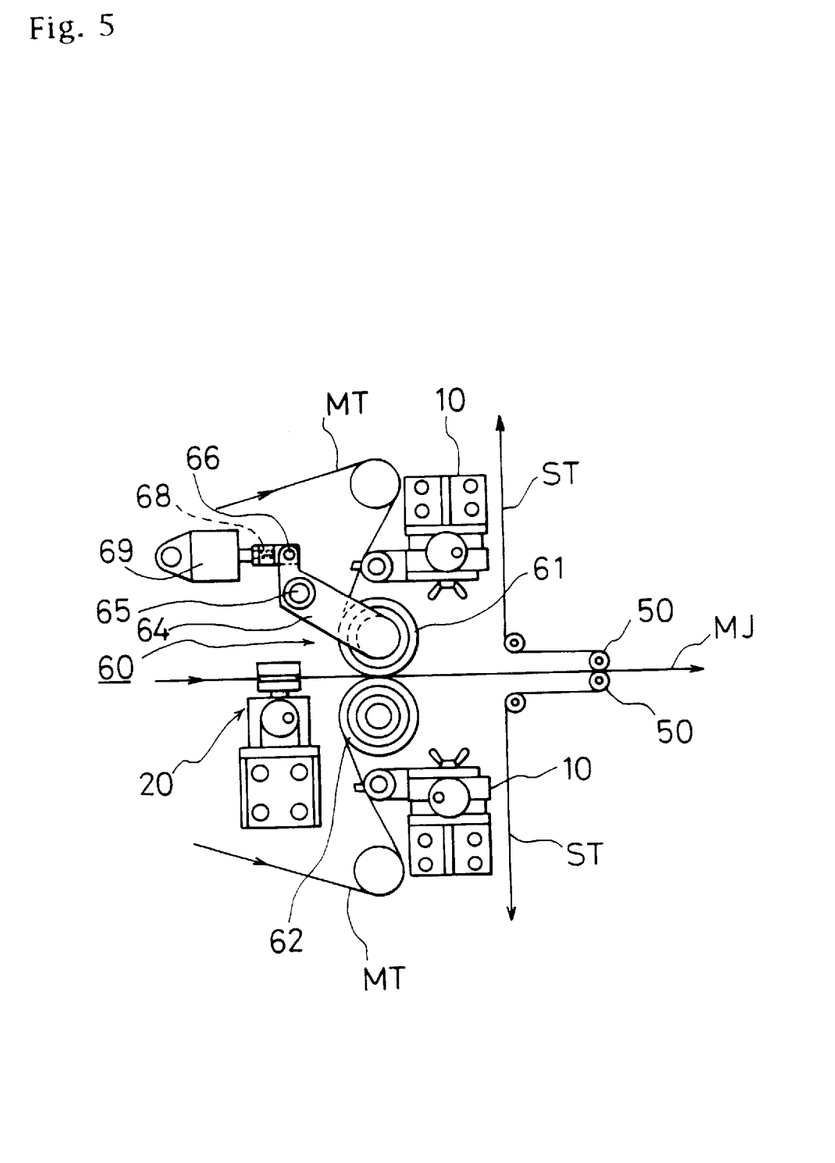
FIG. 5 is a front view showing components in the vicinity of the masking tape of FIG. 1.

The first pressure adhering unit 60 which is operated at the third step comprises a first lower roll 62 which is secured to the masking tape applying apparatus 1, and a first upper roll 61 disposed a vertically above the first lower roll 62 having a biasing mechanism which is capable of adjusting the biasing force.

The mechanism for biasing the first upper roll 61 mainly comprises a bracket 64 for journalling the first upper roll 61, a bracket support pin 65 for swingably journalling the bracket 64, a screw 68 which is threaded with a pivot portion 66, said pivot portion 66 being pivotally connected with the bracket 64 on the side opposite to the first upper roll 61 and a base 69 which is linked with the screw 68 and is secured to the masking tape applying apparatus 1.

Two nuts are engaged with the screw 68. The biasing force of the first upper roll 61 is adjusting by fastening or unfastening the nut on the side of the pivot portion of the bracket 64. After completion of the adjustment of the biasing force, a constant biasing force can be maintained by fastening the other nut for locking it.

As an alternative of the above-mentioned biasing mechanism, spring or weight may constitute the biasing mechanism.

The separating unit which is operated at the fourth step comprises a separating roll 50 for peeling the masking tape MT from the metal strip J, a take-up shaft 7 which is driven by a motor to take-up the peeled scrap tape ST, and a recovery dancer 40 which adjusts the take-up speed of the take-up shaft 7 for the scrap tape ST and the tension of the scrap tape ST.

It is preferable that the separating roll 50 be made of a roller having an outer diameter which is as small as possible. Since it take a longer period of time to finish the complete separation between the masking tape MT and the metal strip J when a roller having a larger outer diameter is used, undesirable vibration and/or winding of the metal strip J may occur.

Since the take-up shaft 7 and the recovery dancer 40 are essentially of the same structure of the feeding shaft 6 and the supplying dancer 30 of the masking tape supply unit, detailed description of them will be omitted.

In order to enhance the adhering ability between the masking tape MT and the metal strip J at the time when they are adhered to each other, it is preferable to provide a pre-heating heater 3 for heating the metal strip J beforehand prior to the adhesion of the masking tape MT.

In order to enhance the adhering ability between the masking tape MT and the metal strip J after they are adhered to each other, it is preferable to provide a post-heating heater 4, a guide unit 80 and a second pressure adhering unit 70 at a subsequent step.

The post-heating heater 4 is preferably the same as preheating heater 3. The guide unit 80 is preferably the same as the guide unit 20. The second pressure adhering unit 70 is preferably the same as the first pressure adhering unit 60.

It is further preferable that an image sensor 8 be provided for successively examining whether the masking tape MT adhered on the metal strip MJ has specified sizes.

Now, the process for applying masking tape in accordance with the present invention will be described in detail.

The metal strip J is supplied to the first pressure adhering unit 60 at the first step while it is disposed between the grooves 21a of paired guide roller 21 of the guide unit 20 so that it is restricted in a width direction. The masking tape MT is supplied to the first pressure adhering unit 60 from the tape roll TR mounted on the feeding shaft 6 via the supplying dancer 30 while the speed of the masking tape is controlled to the same as that of the metal strip J.

The masking tape MT is cut into tapes having predetermined widths by the cutter 11 of the cutting unit 10 immediately prior to the first pressure adhering unit 60.

The cut masking tapes MT are pressure adhered to the metal strip J by the first pressure adhering unit 60.

After adhering, unnecessary masking tapes MT are peeled from the metal strip J as scrap tapes ST by separating roll 50. The peeled scrap tapes ST are taken-up by the take-up shaft 7 via the recovery dancer 40.

The cutter blades 11a and the spacers 11b are preliminary set to provide predetermined cutting widths. The origin or home position of the slide mechanism of the cutting unit 10 is adjusted for the graduation on the micrometer knob 28 with reference to the roll 21 which is journalled on the stationary roll holder 23 of the guide unit 20. An operator can easily adjust the position of the cutters by actuating the micrometer knob 28 while visually confirming an examination image from the image sensor 8.

A process for continuously applying masking tapes on an elongated metal strip in a longitudinal direction thereof in accordance with the present invention comprises a first step for guiding said metal strip to a given position in a width direction thereof; a second step for continuously cutting an original masking tape into a given number of tapes having predetermined widths with reference to said guided given position and for supplying them; a third step for continuously pressure adhering said cut masking tapes on said elongated metal strip by means of pressure adhering means; and a fourth step for continuously separating and removing part of said applied masking tapes. Accordingly, the cutters can be provided in a close relationship with the first lower and upper rolls or the pressure adhering rolls. This makes it possible to pressure adhere the cut masking tapes on the metal strip immediately after cutting of the masking tapes. Since unnecessary tapes are removed after application of the masking tape, no spaces are formed between the masking tapes on application of them. Therefore, there is less variation in tape position, which can enhance the accuracy of the position of application of the masking tapes Even if the amount of the unnecessary tapes is larger relative to the width of the original masking tape, tension on the masking tape will not change before and after cutting of the tape since unnecessary masking tape is removed after the masking tapes have been adhered. The masking tapes can be adhered without elongation even if they are fine. The present invention can cope with the narrowing of the width of the stripe.

What is claimed is:

1. A process for continuously applying masking tape on an elongated metal strip in a longitudinal direction thereof, comprising:

a first step for guiding said metal strip to a given position in a width direction thereof;

a second step for continuously cutting an original masking tape into a given number of tapes having predetermined widths with reference to said guided given position and for supplying them;

a third step for continuously pressure adhering said cut masking tapes on said elongated metal strip by means of pressure adhering means; and a fourth step for continuously separating and removing part of said applied masking tapes.

2. A process for applying masking tapes as defined in claim 1 in which said first step includes a step for guiding said metal strip by vertically or laterally sandwiching it between a pair of rolls.

3. A process for applying masking tapes as defined in claim 1 in which said second step includes a step for cutting a masking tape by cutting means having a blade portion in which a plurality of blades are disposed in given positions in a width direction of the masking tape, a holding portion for holding said blade portion; a slide portion for sliding in the width direction of the masking tape said blade portion together with said holding portion; and measuring portion for finely adjusting the position of said slide portion; and a portion for securing said slide portion.

4. A process for applying masking tapes as defined in claim 1 in which said third step includes a step for continuously pressure adhering masking tapes on said metal strip by vertically sandwiching them between a fixed lower roll and an upper roll liftably provided above said lower roll, having means for adjusting the applying pressure on said lower roll.

5. A process for applying masking tapes as defined in claim 1 in which said fourth step includes a step for continuously separating part of masking tape adhered to said metal strip by using a roll having a smaller diameter downstream of said upper roll.

6. A process for applying masking tapes as defined in claim 2 in which said second step includes a step for cutting a masking tape by cutting means having a blade portion in which a plurality of blades are disposed in given positions in a width direction of the masking tape, a holding portion for holding said blade portion; a slide portion for sliding in the width direction of the masking tape said blade portion together with said holding portion; and measuring portion for finely adjusting the position of said slide portion; and a portion for securing said slide portion.

7. A process for applying masking tapes as defined in claim 2 in which said third step includes a step for continuously pressure adhering masking tapes on said metal strip by vertically sandwiching them between a fixed lower roll and an upper roll liftably provided above said lower roll, having means for adjusting the applying pressure on said lower roll.

8. A process for applying masking tapes as defined in claim 3 in which said third step includes a step for continuously pressure adhering masking tapes on said metal strip by vertically sandwiching them between a fixed lower roll and an upper roll liftably provided above said lower roll, having means for adjusting the applying pressure on said lower roll.

9. A process for applying masking tapes as defined in claim 2 in which said fourth step includes a step for continuously separating part of masking tape adhered to said metal strip by using a roll having a smaller diameter downstream of said upper roll.

10. A process for applying masking tapes as defined in claim 3 in which said fourth step includes a step for continuously separating part of masking tape adhered to said metal strip by using a roll having a smaller diameter downstream of said upper roll.

11. A process for applying masking tapes as defined in claim 4 in which said fourth step includes a step for continuously separating part of masking tape adhered to said metal strip by using a roll having a smaller diameter downstream of said upper roll.

12. An apparatus for continuously applying masking tape on an elongated metal strip in a longitudinal direction thereof, comprising:

means for guiding said metal strip to a given position in a width direction thereof;

means for continuously cutting an original masking tape into a given number of tapes having predetermined widths with reference to said guided given position and for supplying them;

pressure adhering means for continuously pressure adhering said cut masking tapes on said elongated metal strip; and means for continuously separating and removing part of said applied masking tapes.

13. An apparatus for applying masking tapes as defined in claim 12 in which said guiding means includes a pair of rolls for guiding said metal strip by vertically or laterally sandwiching it therebetween.

14. An apparatus for applying masking tapes as defined in claim 12 in which said cutting means includes a blade portion in which a plurality of blades are disposed in given positions in a width direction of the masking tape, a holding portion for holding said blade portion; a slide portion for sliding in the width direction of the masking tape said blade portion together with said holding portion; and measuring portion for finely adjusting the position of said slide portion; and a portion for securing said slide portion.

15. An apparatus for applying masking tapes as defined in any one of claim 12 in which said adhering means includes a fixed lower roll and an upper roll liftably provided above said lower roll, having means for adjusting the applying pressure on said lower roll.

16. An apparatus for applying masking tapes as defined in any of claim 12 in which said separating means includes a roll having a smaller diameter downstream of said upper roll for continuously separating part of masking tape adhered to said metal strip.

17. An apparatus for applying masking tapes as defined in claim 13 in which said cutting means includes a blade portion in which a plurality of blades are disposed in given positions in a width direction of the masking tape, a holding portion for holding said blade portion; a slide portion for sliding in the width direction of the masking tape said blade portion together with said holding portion; and measuring portion for finely adjusting the position of said slide portion; and a portion for securing said slide portion.

18. An apparatus for applying masking tapes as defined in claim 13 in which said adhering means includes a fixed lower roll and an upper roll liftably provided above said lower roll, having means for adjusting the applying pressure on said lower roll.

19. An apparatus for applying masking tapes as defined in claim 14 in which said adhering means includes a fixed lower roll and an upper roll liftably provided above said lower roll, having means for adjusting the applying pressure on said lower roll.

20. An apparatus for applying masking tapes as defined in claim 12 in which said separating means includes a roll having a smaller diameter downstream of said upper roll for continuously separating part of masking tape adhered to said metal strip.

* * * * *